US008246160B2

(12) United States Patent
Uchida

(10) Patent No.: US 8,246,160 B2
(45) Date of Patent: Aug. 21, 2012

(54) RECORDING APPARATUS

(75) Inventor: Haruo Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1014 days.

(21) Appl. No.: 12/116,820

(22) Filed: May 7, 2008

(65) Prior Publication Data

US 2008/0278523 A1 Nov. 13, 2008

(30) Foreign Application Priority Data

May 10, 2007 (JP) ................................. 2007-125234

(51) Int. Cl.
*B41J 2/01* (2006.01)
*G01D 15/00* (2006.01)

(52) U.S. Cl. ......................... 347/104; 346/134; 271/186

(58) Field of Classification Search .................. 347/104; 346/134; 271/186
See application file for complete search history.

(56) References Cited

U.S. PATENT DOCUMENTS 5,666,629 A * 9/1997 Kazoh .......................... 399/401
5,854,965 A * 12/1998 Kasiwabara et al. ......... 399/381
7,438,288 B2 * 10/2008 Nishiberi et al. ............. 271/256
7,561,823 B2 * 7/2009 Johnson et al. ............... 399/107
8,113,500 B2 * 2/2012 Tsai et al. .................... 271/3.14
2004/0086310 A1 * 5/2004 Eskey ........................... 399/401
2005/0099480 A1 * 5/2005 Saito et al. .................... 347/104

FOREIGN PATENT DOCUMENTS

JP 04-256643 A 9/1992
JP 6-48634 2/1994
JP 07-109075 A 4/1995
JP 8-12158 1/1996
JP 2005-074745 A 3/2005
JP 2006-069737 A 3/2006

* cited by examiner

*Primary Examiner* — Daniel Petkovsek
(74) *Attorney, Agent, or Firm* — Canon USA Inc IP Division

(57) ABSTRACT

A recording apparatus that forms an image on a recording medium includes a U-turn conveying path and a redirecting conveying path. The U-turn conveying path reverses the front and back of the recording medium and conveys the recording medium to a conveying roller. The redirecting conveying path reverses a conveying direction of the recording medium, fed from the front side of a main body of the apparatus, at an upstream side of the conveying roller in the conveying direction, and conveys the recording medium to the conveying roller. Then, a first recording medium is conveyed along the U-turn conveying path, and a second recording medium is conveyed along the redirecting conveying path.

9 Claims, 17 Drawing Sheets

RECORDING APPARATUS

BACKGROUND OF THE INVENTION

1. Field of the Invention

The present invention relates to a recording apparatus that forms an image onto a recording medium, which is conveyed by a conveying roller, by using a recording head. More particularly, the present invention relates to a novel recording apparatus having a conveying path.

2. Description of the Related Art

In a recording apparatus that forms an image onto a recording medium by using a recording head, a recording medium that is fed from a sheet feeding unit is conveyed to an image forming section by a conveying roller. Then, an image is formed onto the recording medium that is conveyed through the image forming section. A recording apparatus including, as a conveying mechanism of a recording apparatus, a duplex recording conveying mechanism instead of a conveying mechanism that conveys a recording medium that is supplied from the back side of the apparatus is available. The duplex recording conveying mechanism can perform duplex recording by U-turning and conveying a recording medium. In addition, a U-turn conveying mechanism that conveys a recording medium from a front sheet feeding section (that supplies the recording medium from the front side of the lower portion of an apparatus) by causing the recording medium to make a U-turn is also known.

In recent years, in recording apparatuses, such as personal printers, there is a rapidly increasing demand for a multifunction printer that is provided with a copying function and a scanner function as a result of disposing a scanner at the upper portion of a main body of the apparatus. In an inkjet recording apparatus that performs a recording operation by discharging ink from a discharge port of a recording head, recording image quality is improved by increasing landing precision of an ink drop and by increasing density of ink drops as a result of forming finer ink drops. To improve recording image quality, such as a photo-print quality, recording media are being improved. In addition, to improve recording image quality and storage property (such as gas resistance), a coat layer is provided at a recording surface.

The coat layer on the recording surface is easily scratched when it comes into contact with a guide surface while the recording medium is being conveyed. Accordingly, this problem needs to be solved. In addition, for the purpose of further increasing photo-print quality, the demand for a thick photo sheet is increasing. However, since a thick photo sheet is highly rigid, its conveyance resistance when the thick photo sheet is conveyed is high. Therefore, the recording surface of the thick photo sheet tends to be more frequently scratched. Under such circumstances, the following problems need to be solved.

First, in a multifunction printer having a scanner disposed at the upper portion of a main body of the apparatus, a sheet feeding section disposed at the upper portion of the main body of the apparatus is positioned behind the scanner. Therefore, work efficiency when recording media are loaded into the sheet feeding section is reduced, thereby reducing operational performance.

Second, for improving settability of the recording media with respect to the sheet feeding section at the upper portion of the apparatus, an opening of the sheet feeding section may be widened. However, for widening the opening, the scanner needs to be moved towards the front, thereby increasing the depth of the apparatus.

To overcome the aforementioned problems, all the recording media may be fed from the front side of the main body of the apparatus to perform a front sheet feeding operation in which the recording media are reversely fed using a U-turn conveying path. However, in the U-turn sheet feeding operation, the recording surfaces (coat surfaces) of the recording media become the outer surfaces. Therefore, the recording surfaces come into contact with a conveying guide surface, and tend to be scratched. When a thick photo sheet is used, the rigidity of the sheet is further increased. As a result, the recording surface of the thick photo sheet is caused to more strongly contact the conveying guide surface, thereby making it more difficult to prevent the thick photo sheet from being scratched when the sheet is being conveyed. Accordingly, it is difficult to convey all of the recording media by the U-turn sheet feeding operation.

To overcome the aforementioned problems, the recording media may be fed in the opposite direction from an eject portion of the recording apparatus, and may be redirected before they pass through a nip portion of conveying rollers. However, in this structure, since the feeding and the ejection of the recording media are performed in the same conveying path, a mechanism that switches the conveying path is required, thereby causing the conveying mechanism to become complex. In addition, a recording medium can only be fed after completing the ejection of a preceding recording medium. Therefore, the recording media cannot be continuously conveyed. As a result, the recording time cannot be reduced.

Japanese Patent Laid-Open No. 8-12158 discusses a structure that performs a front sheet feeding operation in which a recording medium is fed from below a sheet ejecting section, is conveyed to a conveying roller, and is redirected just before passing the conveying roller. However, in this structure, the recording media cannot be continuously conveyed, as a result of which recording time cannot be reduced.

Japanese Patent Laid-Open No. 6-48634 discusses a structure in which a front sheet feeding operation is performed on a recording medium to a stock portion from below a location where sheet ejection is performed. However, in this structure, a conveying path, used when the recording medium is pulled in while the recording medium is redirected, extends horizontally to the back side of the main body of an apparatus. Therefore, the depth of the main body of the apparatus becomes large. In addition, a conveying path for performing duplex recording and a horizontal conveying path for conveying CDs, DVDs, or thick sheets need to be formed separately from a conveying path used after the recording medium is redirected. Therefore, the size of the entire conveying section is increased. Further, since the recording sheet is redirected in the conveying path that is provided separately from the other conveying paths, conveying mechanical sections cannot be made common, thereby complicating the structure and increasing costs.

SUMMARY OF THE INVENTION

The present invention provides a recording apparatus that allows a recording medium to make a U-turn and to be redirected, and that can restrict scratching of a recording surface of the recording medium when the recording medium and a conveying path contact each other. The present invention also provides a recording apparatus which can maintain recording speed due to continuous conveyance of recording media, and which can downsize a conveying mechanism.

According to an aspect of the present invention, a recording apparatus that performs recording on recording media by a recording head is provided. The recording apparatus includes a stacking section at which the recording media are stacked, and a reversing path facilitating conveying the recording media in a direction opposite to that when the recording is performed by the recording head, and reversing front and back sides of the recording media. When a first recording medium is conveyed from the stacking section, the first recording medium is conveyed in the reversing path in a first direction that is the same as that when the front and back sides of the recording medium are reversed. When a second recording medium, which is different from the first recording medium, is conveyed from the stacking section, the second recording medium is conveyed in the reversing path in the first direction, and, then, is conveyed in a second direction that is opposite to the first direction.

Further features of the present invention will become apparent from the following description of exemplary embodiments with reference to the attached drawings.

DESCRIPTION OF THE EMBODIMENTS

First Exemplary Embodiment

Figure 1:
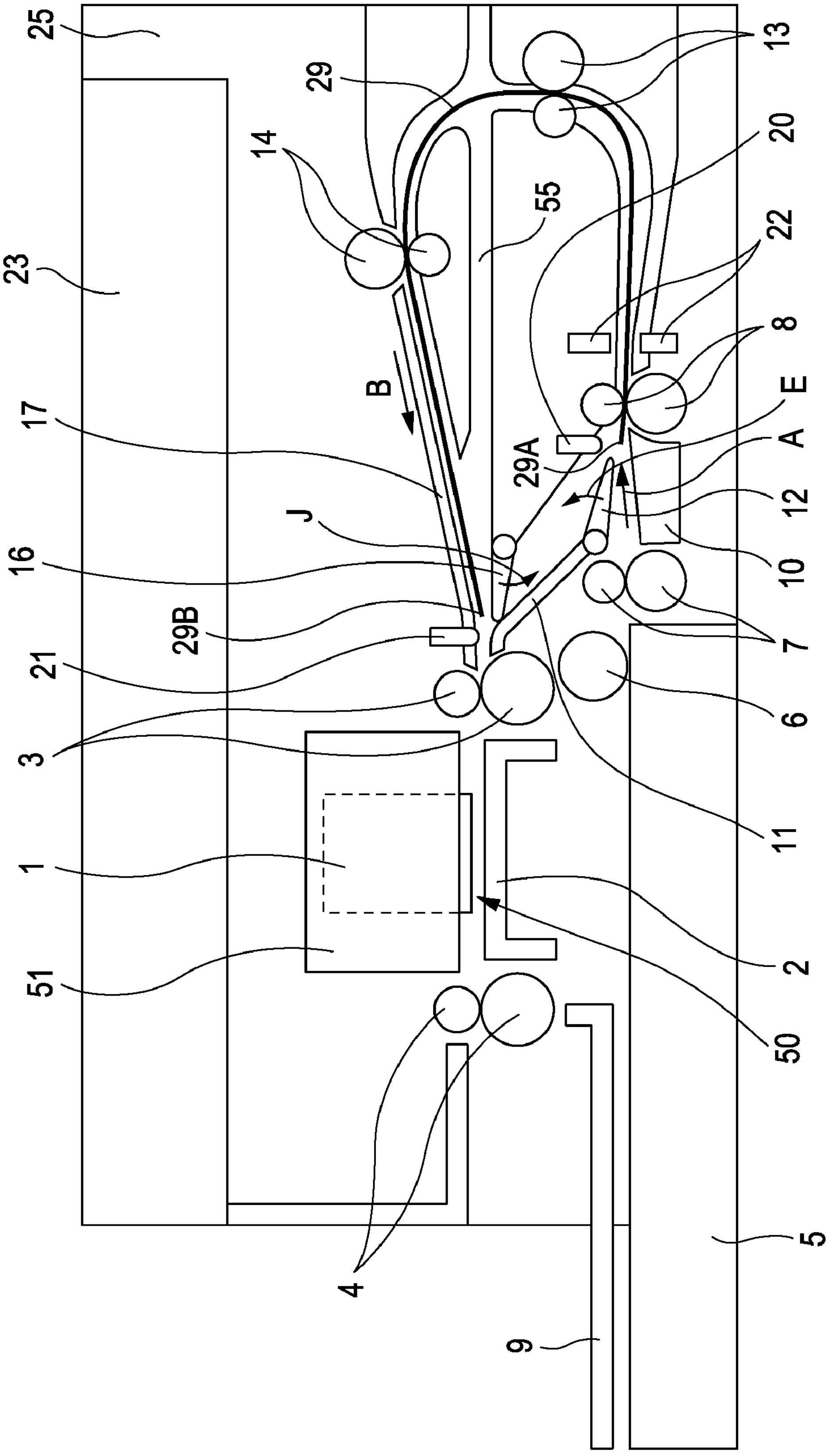
FIG. 1 is a vertical sectional view showing a state just before a recording medium is redirected in a recording apparatus according to a first exemplary embodiment of the present invention.
Figure 2:
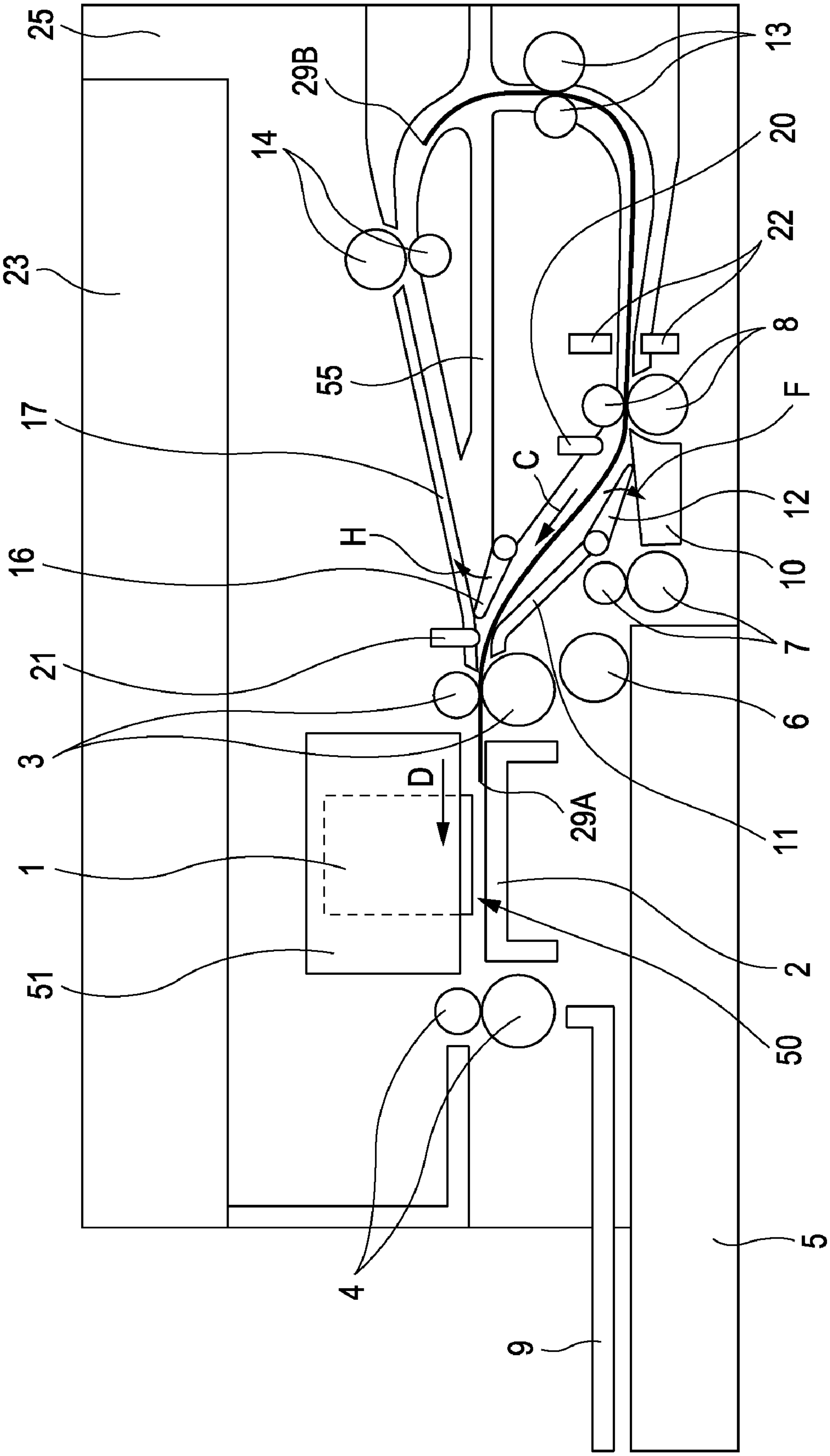
FIG. 2 is a vertical sectional view showing a state when the recording medium is redirected.
Figure 3:
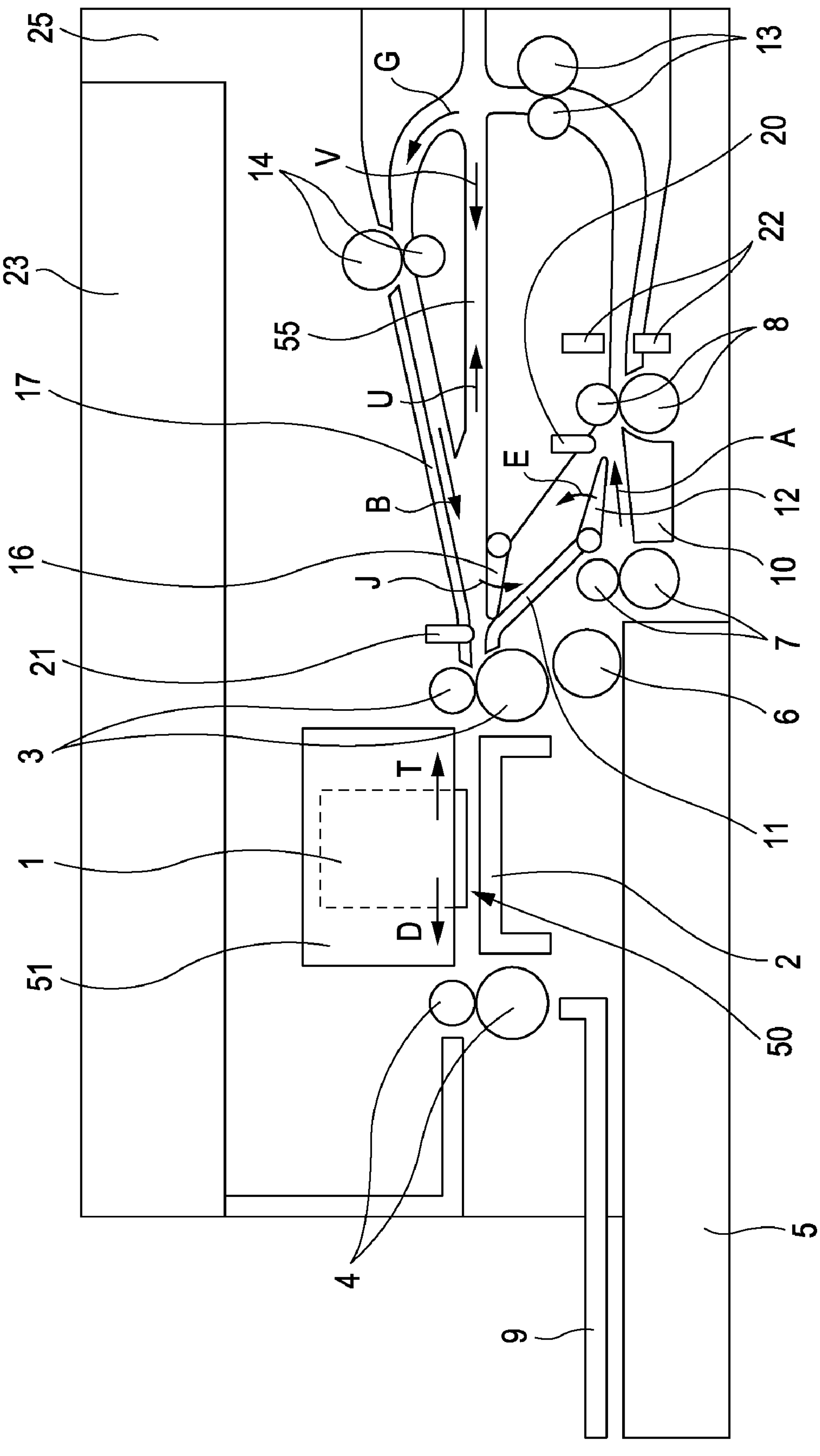
FIG. 3 is a vertical sectional view for illustrating a state when the recording medium makes a U-turn, and a state when a recording medium having a high rigidity reciprocates along a horizontal conveying path.
Figure 4:
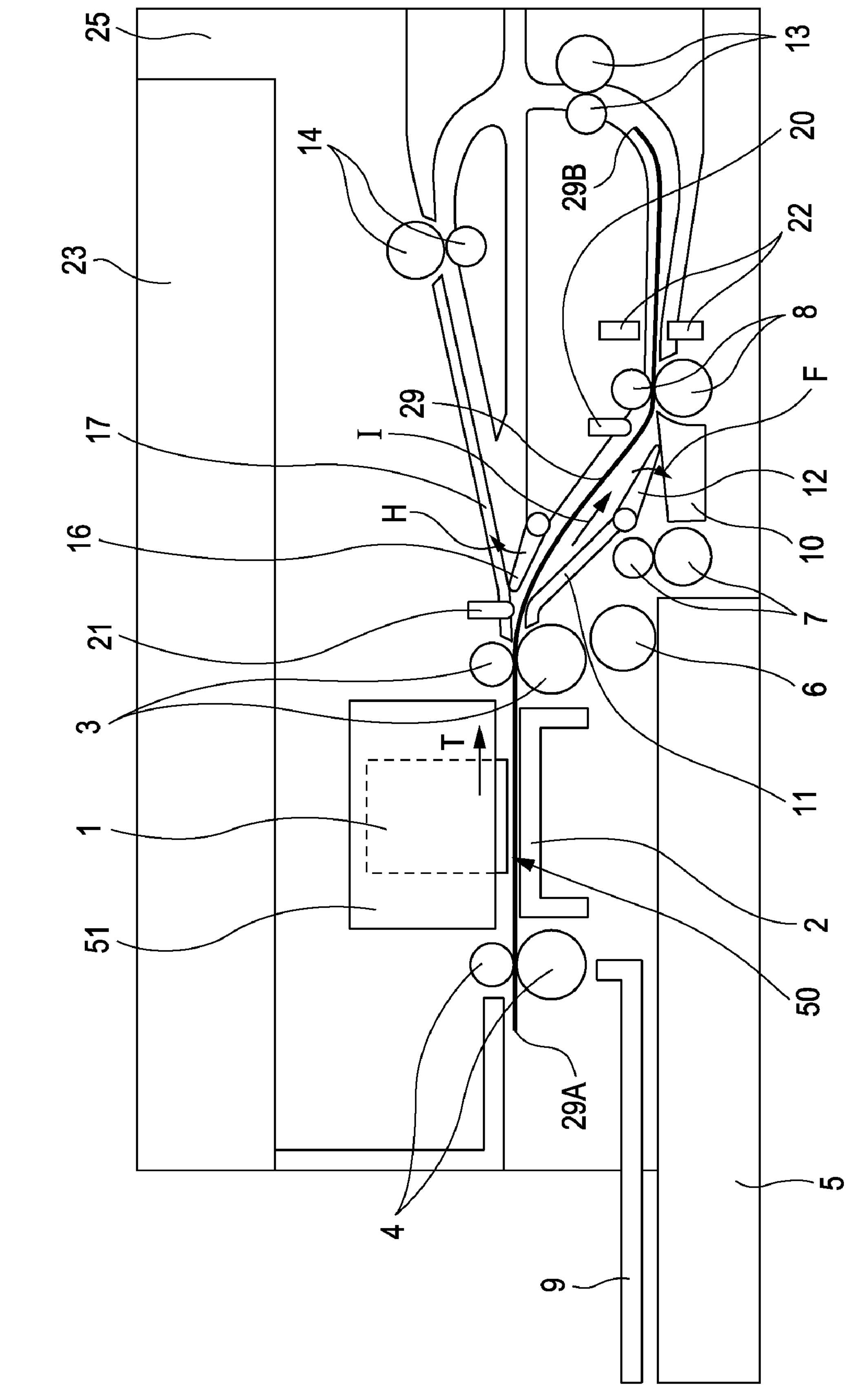
FIG. 4 is a vertical sectional view showing a state in which, for performing a duplex recording operation, a recording medium having one side recorded is reversely conveyed to pull the recording medium into a U-turn conveying path.
Figure 5:
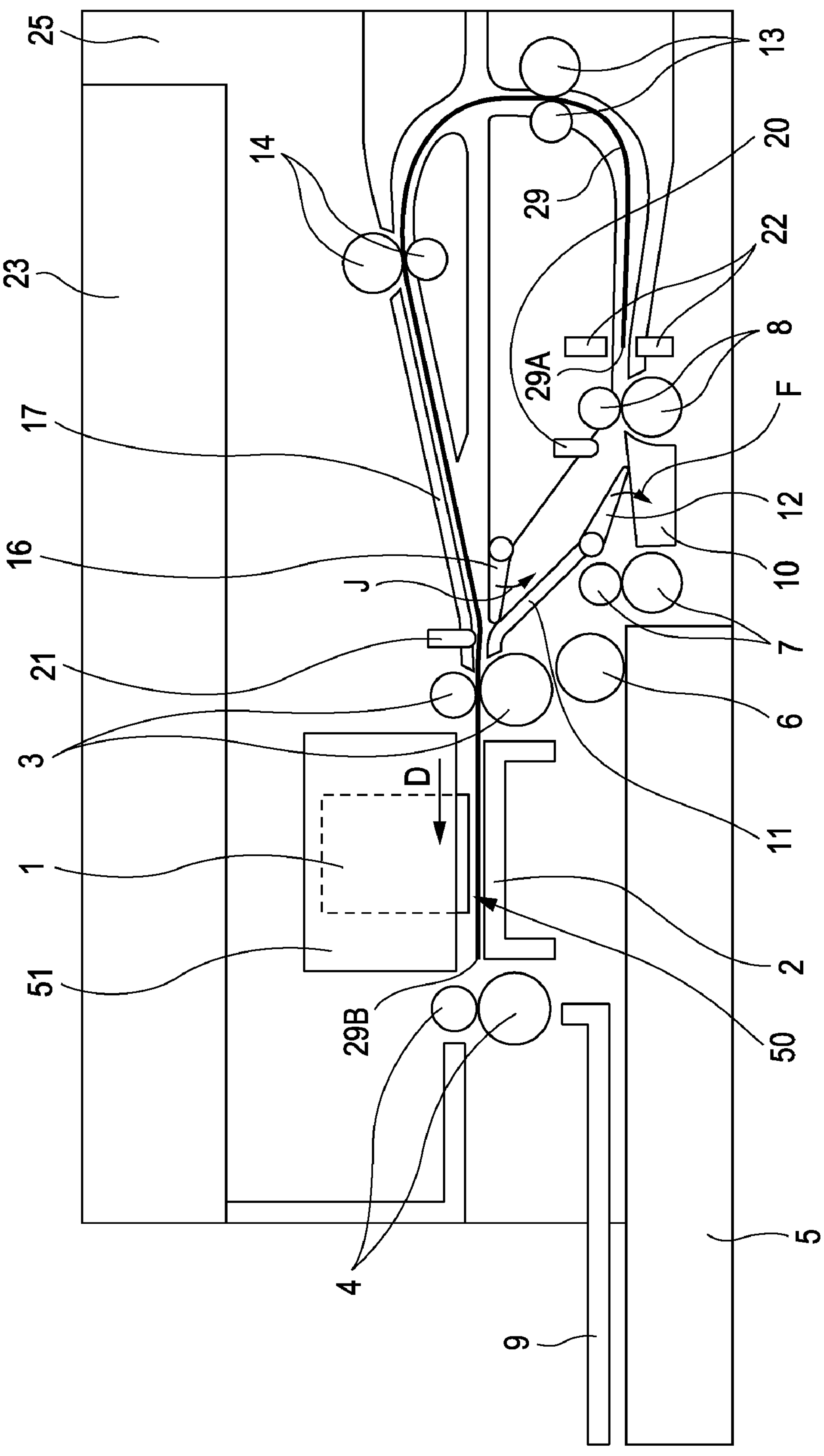
FIG. 5 is a vertical sectional view showing a state when the recording medium is conveyed along the U-turn conveying path to record an image on the recording medium at an image forming portion.
Figure 6:
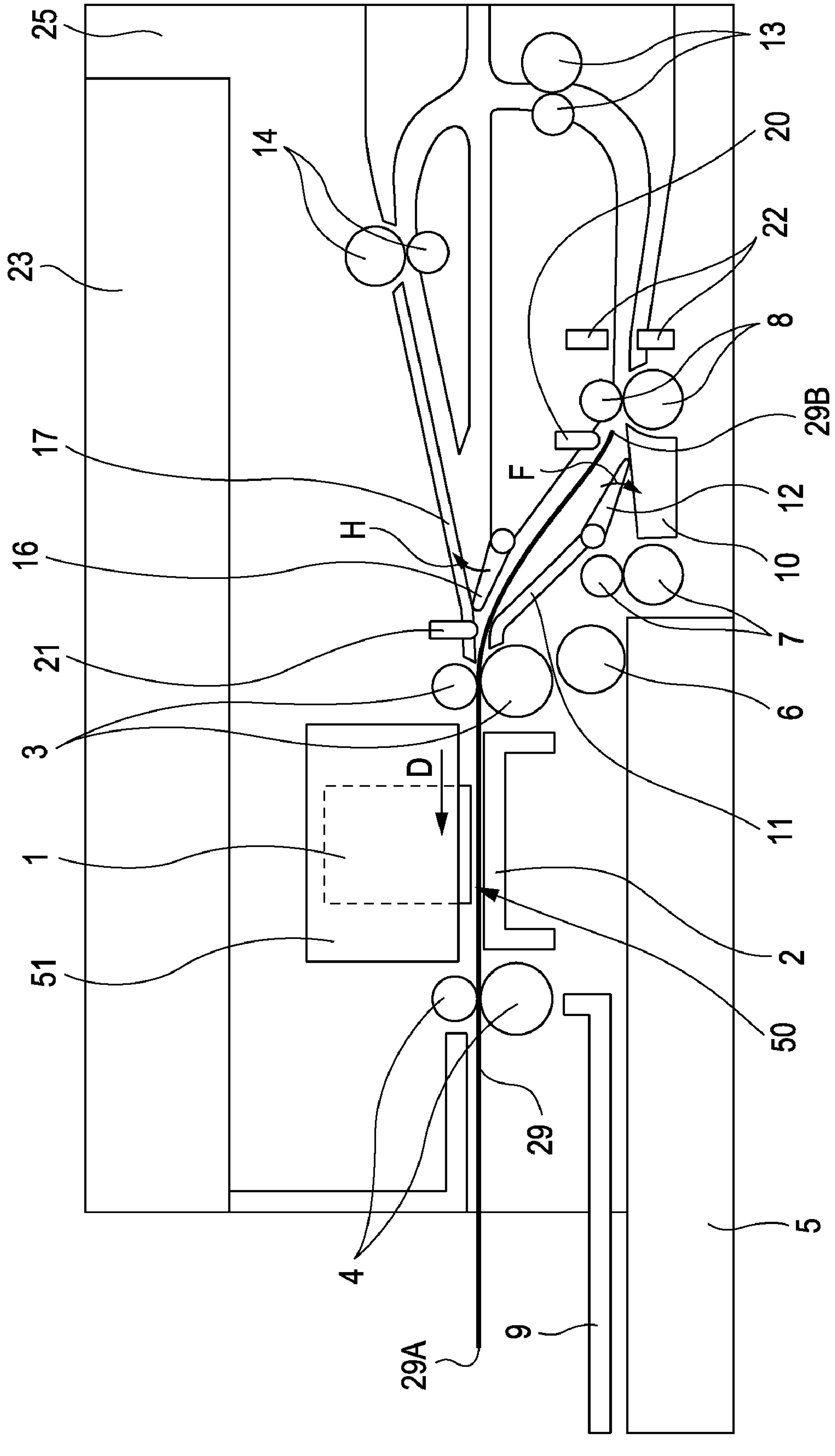
FIG. 6 is a vertical sectional view showing a state in which a preceding recording medium during continuous conveyance is redirected to perform a recording operation.
Figure 7:
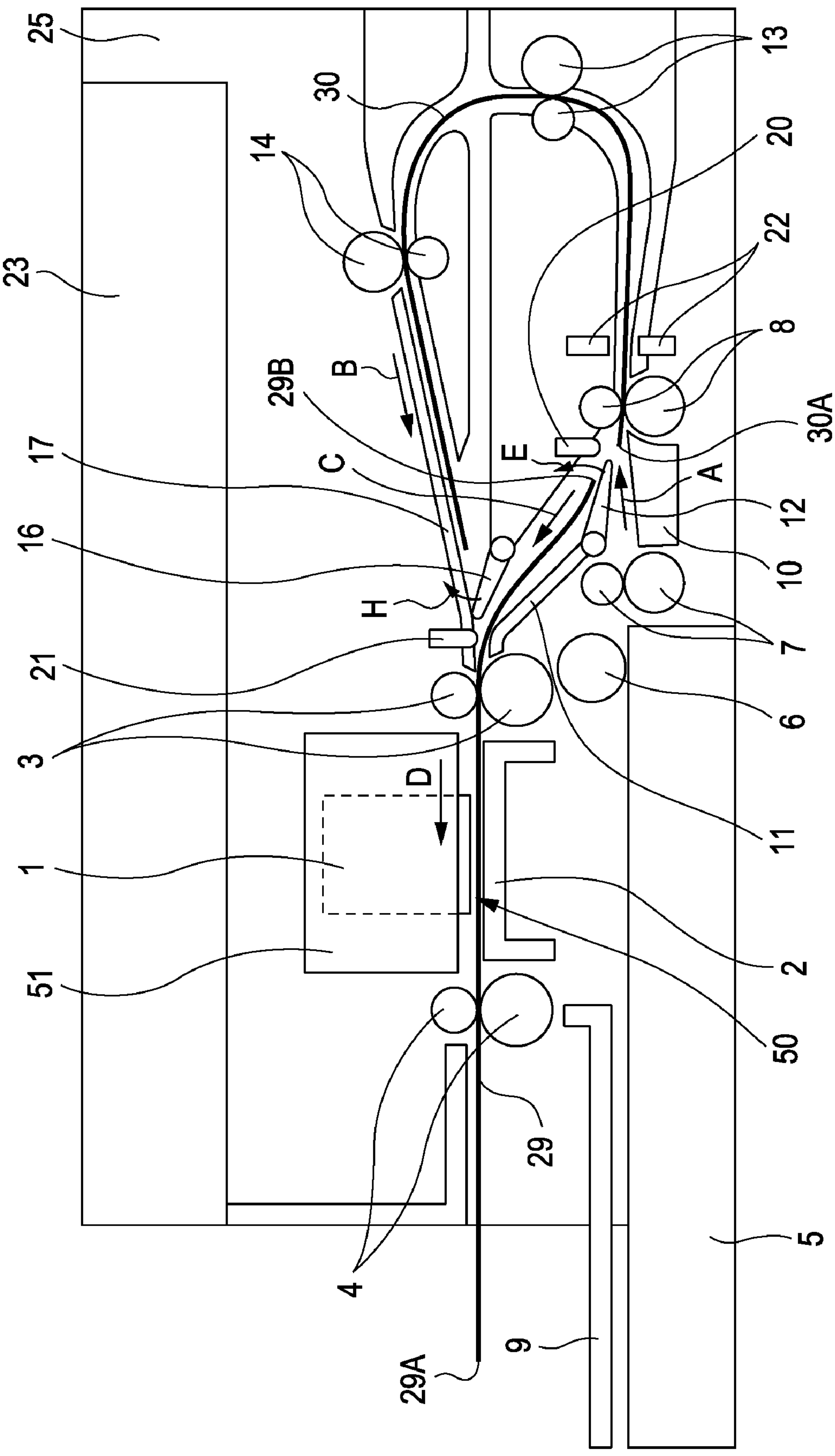
FIG. 7 is a vertical sectional view showing a state when redirection of a next recording medium during the continuous conveyance is started.
Figure 8:
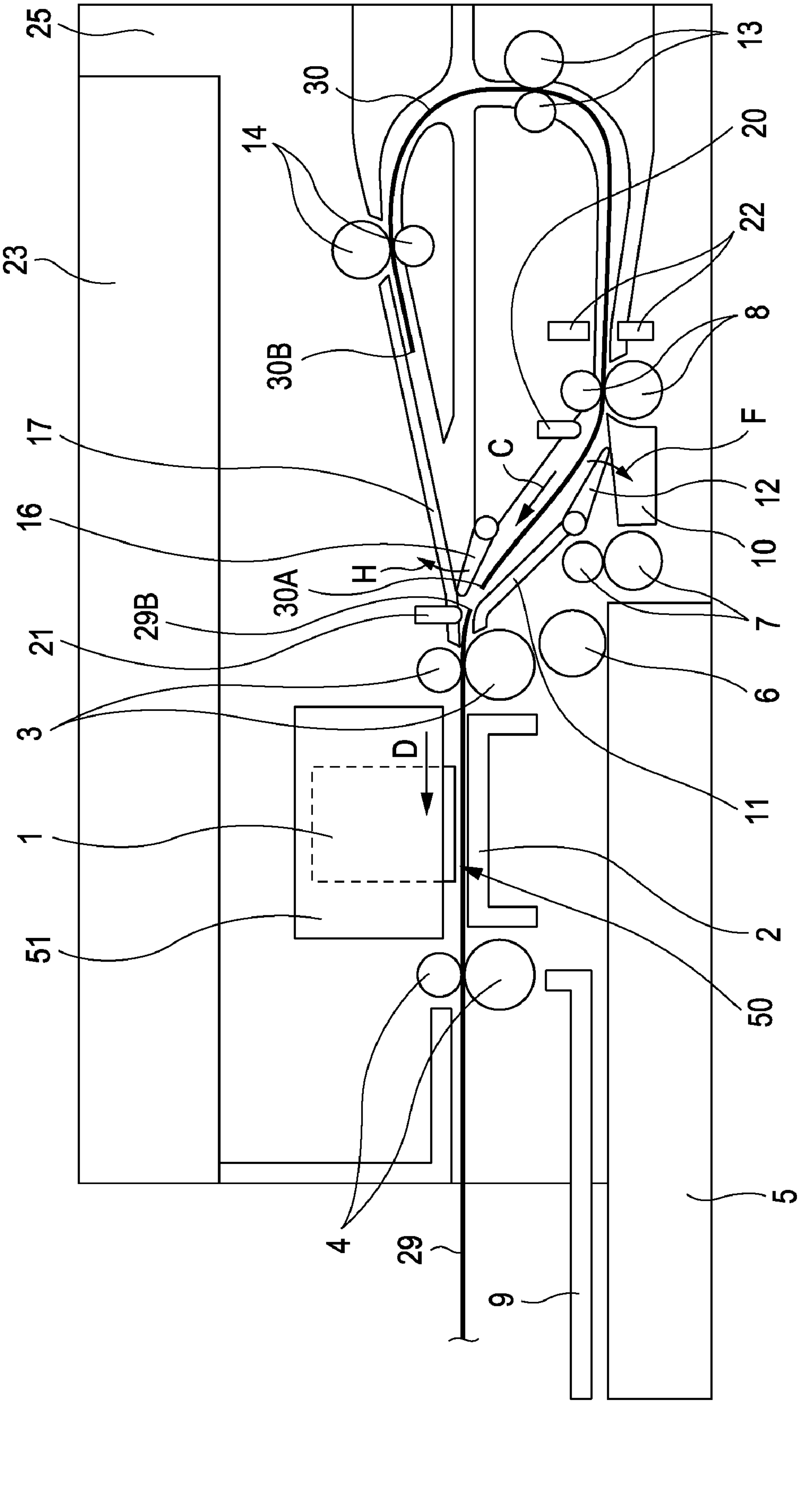
FIG. 8 is a vertical sectional view showing a state when the next recording medium during the continuous conveyance is redirected.

Exemplary embodiments of the present invention will now be described in detail below with reference to the drawings. Throughout the figures, the same reference numerals refer to the same or corresponding parts. FIGS. 1 to 8 are vertical sectional views of a recording apparatus according to a first exemplary embodiment of the present invention. FIG. 1 shows a state after a special sheet is conveyed and just before the special sheet is redirected. FIG. 2 shows a state when the special sheet is redirected. FIG. 3 illustrates a state when an ordinary sheet makes a U-turn, and a state when a recording medium having a high rigidity reciprocates along a horizontal conveying path. FIG. 4 shows a state in which, for performing a duplex recording operation, a recording medium having one side recorded is reversely conveyed to introduce the recording medium to a U-turn conveying path. FIG. 5 shows a state when the recording medium is conveyed along the U-turn conveying path from the state shown in FIG. 4 to record an image on the recording medium at an image forming portion. FIG. 6 shows a state in which, during continuous conveyance, a first recording medium is redirected to perform a recording operation on the first recording medium at the image forming portion. FIGS. 7 and 8 each show a state in which, during the continuous conveyance, redirection of a second recording medium is started subsequent to the redirection of the first recording medium.

A recording head 1 is removably carried by a carriage 51 that can reciprocate in a direction intersecting a conveying direction of a recording medium. As the recording head 1, for example, an inkjet recording head which, on the basis of image information, selectively discharges ink from a plurality of discharge ports to form an image on the recording medium is used. A platen 2 for supporting the back of the recording medium is disposed at a position that is separated from and that opposes a discharge plane of the recording head 1 that reciprocates. The recording head 1, the carriage 51, the platen 2, etc., constitute an image forming portion 50.

Next, a sheet feeding section will be described. A sheet feeding cassette 5 that holds recording media is removably mounted to a front side of the bottom surface of a main body of the apparatus. Reference numeral 6 denotes a sheet feeding roller that sends out and conveys recording media, held by the sheet feeding cassette 5, one at a time. The recording media that are sent out by the sheet feeding roller 6 are separated from each other one at a time by separating rollers 7, and conveyed. The recording media separated by the separating rollers 7 are guided to first intermediate rollers 8 along a sheet guide 10. A guide flapper 12, which is a movable guiding member for selectively switching a conveying path, is disposed between the separating rollers 7 and the first intermediate rollers 8. In addition, a sheet-edge sensor 20, which can detect a front edge and a rear edge of a recording medium, is disposed between the guide flapper 12 and the first intermediate rollers 8. The sheet-edge sensor 20 is, for example, a photo-interrupter. A media sensor 22, which can detect types of recording media, is disposed near a downstream side of the first intermediate rollers 8 in the conveying direction. The media sensor 22 is, for example, a transmissive sensor or a reflecting sensor.

Next, in the first exemplary embodiment, a U-turn conveying path that reverses the front and back of a recording medium, and conveys the recording medium to conveying rollers 3 will be described. The U-turn conveying path allows duplex recording by causing the recording medium to make a U-turn. Second intermediate rollers 13 and third intermediate rollers 14 are disposed in the U-turn conveying path. The recording medium is conveyed in the direction of arrow B along a sheet guide by the intermediate rollers 13 and 14. The conveying rollers 3 that convey the recording medium to the image forming portion 50 are disposed upstream from the image forming portion 50 in the conveying direction. A sheet guide 11 is disposed between the conveying rollers 3 and the first intermediate rollers 8, and a sheet guide 17 is disposed between the conveying rollers 3 and the third intermediate rollers 14. The sheet guides 11 and 17 constitute guide surfaces for guiding the recording medium to the conveying rollers 3. A guide flapper 16, which is a movable guiding member for selectively switching a conveying path, is disposed at a merging portion of the sheet guides 11 and 17.

A sheet-edge sensor 21, which can detect the front edge and the rear edge of the recording medium, is disposed near the upstream side of the conveying rollers 3 in the conveying direction. Sheet ejecting rollers 4 for ejecting the recording medium are disposed at the downstream side of the image forming portion 50 in the conveying direction. The ejected recording medium is held by a sheet ejecting tray 9. A scanner 23, which reads an image of an original using a reading sensor (such as a CCD sensor), is mounted to the upper portion of a main body 25 of the apparatus.

Next, a redirecting conveying path that conveys the recording medium, which is fed from the front side of the main body 25 of the apparatus, to the conveying rollers 3 by reversing the conveying direction of the recording medium at the upstream side of the conveying rollers 3 in the conveying direction will be described. The redirecting conveying path is a suitable conveying path for conveying a recording medium (special sheet) having a recording surface subjected to surface treatment using, for example, a coat layer. As shown in FIG. 1, the recording media held by the sheet feeding cassette 5 are picked up by the sheet feeding roller 6, and sent to the separating rollers 7. A topmost sheet (here, recording medium 29) is separated from the other recording media, and conveyed to the first intermediate rollers 8 as indicated by arrow A. Here, by moving the guide flapper 12 in the direction of arrow E by a driving operation (not shown), a conveying path from the separating rollers 7 to the first intermediate rollers 8 is provided. The recording medium 29 is conveyed in the direction of arrow A, and the recording medium type is detected when the front edge of the recording medium 29 passes the media sensor 22. Then, when the recording medium 29 is a special sheet (second recording medium), it is redirected as described below.

That is, the recording medium 29 that passes through the separating rollers 7, and that is conveyed in the direction of arrow A is conveyed in the direction of arrow B by the first intermediate rollers 8, the second intermediate rollers 13, and the third intermediate rollers 14, which are disposed in the U-turn conveying path. Here, when the recording medium 29 is long, its front edge may extend beyond the conveying rollers 3, and may be pulled to the top portion of the platen 2. However, the rear edge of the recording medium 29 is detected by the sheet-edge sensor 20 just before the rear edge of the recording medium passes through the first intermediate rollers 8, to stop the conveyance of the recording medium 29. The redirecting conveying path that conveys the recording medium to the conveying rollers 3 by switching a conveying path and by reversely rotating the intermediate rollers 8, 13, and 14 is provided. That is, as shown in FIG. 2, by reversely rotating all of the first intermediate rollers 8, the second intermediate rollers 13, and the third intermediate rollers 14, the recording medium 29 is redirected. The redirecting conveying path is provided when, at a predetermined timing that is in correspondence with the starting of the redirecting of the recording medium 29, the guiding member 16 is moved in the direction of arrow H, and the guiding member 12 is moved in the direction of arrow F.

The redirected recording medium 29 is conveyed in the direction of arrow C in FIG. 2. The recording medium 29 is guided to the sheet guides 11 and 17 and to the flappers 12 and 16, and conveyed to the conveying rollers 3. Then, a recording operation is performed at the image forming portion 50. The redirecting conveying path is formed in the U-turn conveying path. In particular, in the embodiment, the U-turn conveying path and the redirecting conveying path are formed in the same conveying path. In the redirecting conveying path, the recording surface (coat surface) of the recording medium 29 is the illustrated upper surface. Therefore, in the U-turn conveying portion including the second intermediate rollers 13 and the third intermediate rollers 14, the outer surface that comes into contact with the guide surfaces and has high conveyance resistance (contact force) becomes the back surface of the recording medium. Consequently, the problem that the recording surface (coat surface) is scratched as a result of contacting the guide surfaces can be prevented from occurring.

Next, referring to FIG. 3, a U-turn that is made by an ordinary sheet that is fed in the embodiment will now be described. In the embodiment, when the recording medium is an ordinary sheet (first recording medium), it is optimal that the recording medium make a U-turn and be conveyed to the conveying rollers 3 along the U-turn conveying path. In FIG. 3, when a recording medium is conveyed in the direction of arrow A from the sheet feeding cassette 5, and the recording medium is determined as being an ordinary sheet by the media sensor 22, the recording medium makes an ordinary U-turn. In the U-turn conveyance, the recording medium passes along the U-turn conveying path, and is conveyed in the direction of arrow G. Then, the recording medium is further conveyed in the direction of arrow B to the conveying rollers 3. Thereafter, the recording medium is conveyed to the image forming portion 50 by the conveying rollers 3 to record an image on the recording medium. By virtue of such a structure, the recording can be performed on the ordinary sheet without reducing throughput.

In the embodiment, in the case where the media sensor 22 distinguishes between a special sheet and an ordinary sheet, when the recording medium is determined as being a special sheet, the special sheet is redirected. Whereas, when the recording sheet is determined as being an ordinary sheet, the recording sheet is caused to make a U-turn. However, the present invention is not limited thereto. For example, on the basis of media selection information of a printer driver from a personal computer (PC), switching may be performed between a special-sheet conveyance and an ordinary-sheet conveyance. In addition, for example, when the type of recording medium can be determined as being limited to a special sheet, such as an L-type special sheet, from the sheet size, switching between special-sheet conveyance and ordinary-sheet conveyance can be performed by determining the sheet type from sheet-size information.

Next, conveyance that is performed when duplex recording is carried out on the front and back of a recording medium in the embodiment will now be described with reference to FIGS. 4 and 5. After completing recording on a first surface (front surface) of a recording medium 29, the recording medium 29 is conveyed as follows to carry out recording on a second surface (back surface) of the recording medium 29. The recording of the first surface is performed on the recording medium 29 that is fed from the sheet feeding cassette 5, and that is conveyed to the conveying rollers 3. In this case, the recording medium 29 may be conveyed by being redirected or by making a U-turn as mentioned above. In FIG. 4, when the recording of the first surface of the recording medium 29 is ended, the conveying rollers 33 are reversely rotated to convey the recording medium 29 in the opposite direction, so that the recording medium 29 is conveyed from the direction of arrow T to the direction of arrow I. Here, the guide flapper 16 moves in the direction of arrow H, and the guide flapper 12 moves in the direction of arrow F, so that the U-turn conveying path that allows the duplex recording is provided.

Here, while a rear edge 29B during the recording of the first surface of the recording medium 29 is defined as a front edge, the recording medium 29 is conveyed by reversing the front and back of the recording medium 29 along the U-turn conveying path by the first intermediate rollers 8, the second intermediate rollers 13, and the third intermediate rollers 14. As shown in FIG. 5, when the sheet-edge sensor 21 detects that a rear edge 29A of the recording medium 29 (corresponding to the rear edge when the recording medium makes a U-turn) has passed the guide flapper 16, the guide flapper 16 is moved in the direction of arrow J. By this, a conveying path for re-conveying the reversed recording medium 29 to the conveying rollers 3 is provided. Then, the conveying rollers 3 convey the recording medium 29 to the image forming portion 50, to perform a recording operation on the back surface of the recording medium 29 by the recording head 1. The recording medium having both surfaces recorded is ejected to the outside of the main body of the apparatus by the sheet ejecting rollers 4.

Next, the operation and the structure of continuously conveying recording media in the embodiment will now be described with reference to FIGS. 6 to 8. In the embodiment, the recording media are continuously conveyed by being redirected. In FIG. 6, after a recording medium 29 is redirected, recording is performed on the recording medium 29 while it is conveyed in the direction of arrow D by the conveying rollers 3. At this time, the guide flapper 12 moves in the direction of arrow F, and the guide flapper 16 moves in the direction of arrow H, to provide a conveying path. Then, when the sheet-edge sensor 20 detects the passage of a rear edge 29B of the recording medium 29, feeding of a next recording medium 30 from the sheet feeding cassette 5 is started. Then, as shown in FIG. 7, the next recording medium 30 is fed and conveyed in the direction of arrow A, is caused to make a U-turn, and is conveyed in the direction of arrow B by the first intermediate rollers 8, the second intermediate rollers 13, and the third intermediate rollers 14.

At this time, the guide flapper 12 moves in the direction of arrow E, so that a conveying path of the recording medium 30 is provided. In addition, the recording medium 29 is continuously conveyed in the direction of arrow D and the direction of arrow C while a recording operation is performed on the recording medium 29 at the image forming portion 50. When a rear edge 30A of the recording medium 30 is detected by the sheet-edge sensor 20, the first to third intermediate rollers 8, 13, and 14 stop conveying the recording medium 30 in the forward direction, and reversely rotate to reverse the conveying direction, so that redirection of the recording medium 30 in the direction of arrow C is started. At this time, as shown in FIG. 8, the guide flapper 12 moves in the direction of arrow F, so that a redirecting conveying path of the recording medium 30 is provided.

When the rear edge 29B of the recording medium 29 is detected by the sheet-edge sensor 21, the recording medium 30 is further conveyed in the direction of arrow C until its front edge 30A reaches the sheet-edge sensor 21. At this time, while a short interval is maintained between the rear edge 29B of the recording medium 29 and the front edge 30A of the next recording medium 30, both recording media are continuously conveyed at the same time. Then, after a recording operation on the recording medium 29 that is conveyed in the direction of arrow D is completed, it is ejected out of the main body of the apparatus by the sheet ejecting rollers 4. During the ejecting operation, the next recording medium 30 is conveyed in the direction of arrow D by the conveying rollers 3, and an image is formed on the next recording medium 30. Accordingly, the ejecting of the recording medium 29, and the conveying of the next recording medium 30 to the image forming portion 50 are performed at the same time, and the recording media 29 and 30 are continuously conveyed. Therefore, it is possible to reduce recording time when continuously performing the recording operations.

Next, with reference to FIG. 3, reciprocation of a highly rigid recording medium, such as a CD or a DVD, along the horizontal conveying path in the embodiment will be described. In FIG. 3, a horizontal conveying path 55 for reciprocating a recording medium that is inserted from the front side of the main body 25 of the apparatus is formed in the U-turn conveying path. A recording medium that is inserted into the horizontal conveying path 55 from the front side of the main body 25 of the apparatus is a highly rigid recording medium, such as a CD, a DVD, or a thick sheet, that is held by a tray. That is, the tray that is inserted from the front side is conveyed in the direction of arrow T by the reversely rotating sheet ejecting rollers 4, and is conveyed in the direction of arrow U along the horizontal conveying path 55 by the reversely rotating conveying rollers 3. At this time, the guide flapper 16 moves in the direction of arrow J, so that the horizontal conveying path is provided. The tray that is pulled into a predetermined position is, then, conveyed in the direction of arrow D and the direction of arrow V by reversing the direction of rotation of the conveying rollers 3 to the forward direction. At this time, a recording operation is performed on the recording medium at the image forming portion 50. Similarly to the tray, a thick sheet is caused to reciprocate along the horizontal conveying path to record an image on the thick sheet.

Accordingly, in the recording apparatus according to the embodiment, the redirecting conveying path and the horizontal conveying path are formed in the area where the U-turn conveying path is formed. The U-turn conveying path is a conveying path that allows recording to be performed on the front and back surfaces of a recording medium. The redirecting conveying path is a conveying path that is suitable for conveying a special sheet having a recording surface with, for example, a coat layer. The horizontal conveying path is a conveying path that is suitable for conveying a thick recording medium. In the embodiment, the U-turn conveying path is also used for performing a recording operation on an ordinary sheet. In addition, in the embodiment, the redirecting conveying path is formed in the same conveying path as the U-turn conveying path. According to the structure of such conveying paths, it is possible to reduce the depth of the main body of the apparatus, to restrict scratching of the recording surface of a recording medium caused by the recording surface contacting the guide surfaces, to continuously convey recording media, and to make compact the entire conveying mechanism.

Second Exemplary Embodiment

Figure 9:
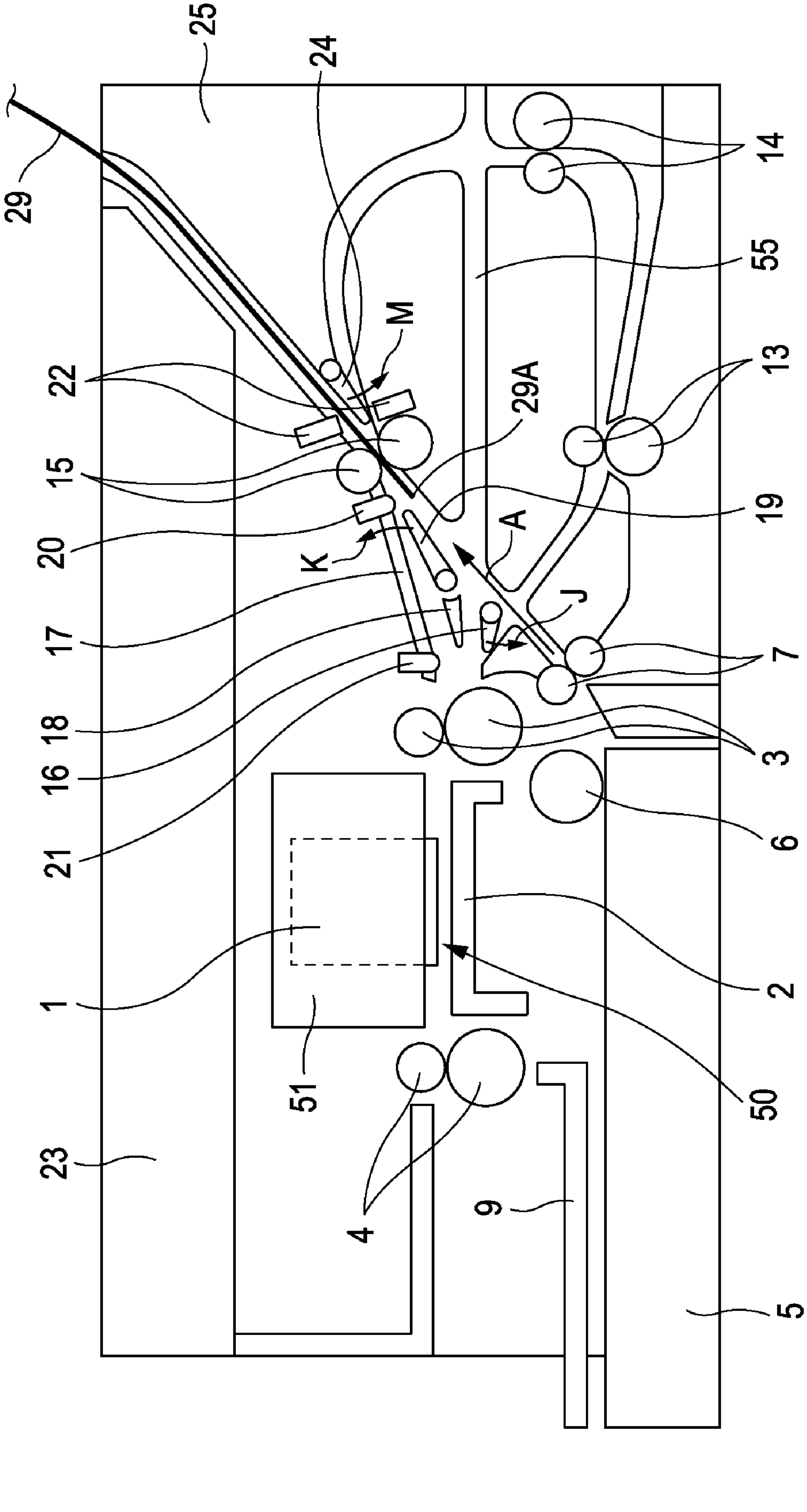
FIG. 9 is a vertical sectional view showing a state just before a recording medium is redirected in a recording apparatus according to a second exemplary embodiment of the present invention.
Figure 10:
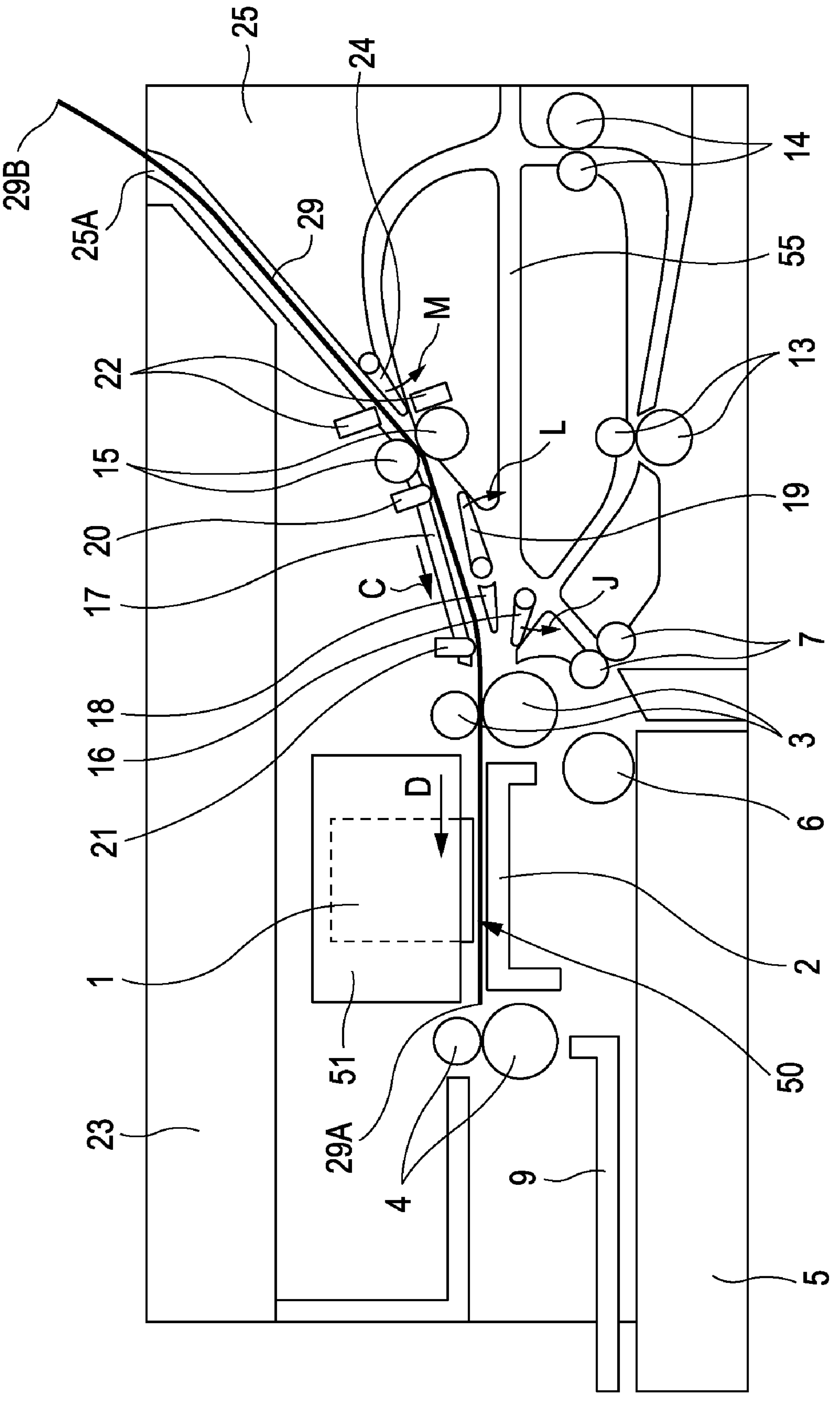
FIG. 10 is a vertical sectional view showing a state when the recording medium is redirected.
Figure 11:
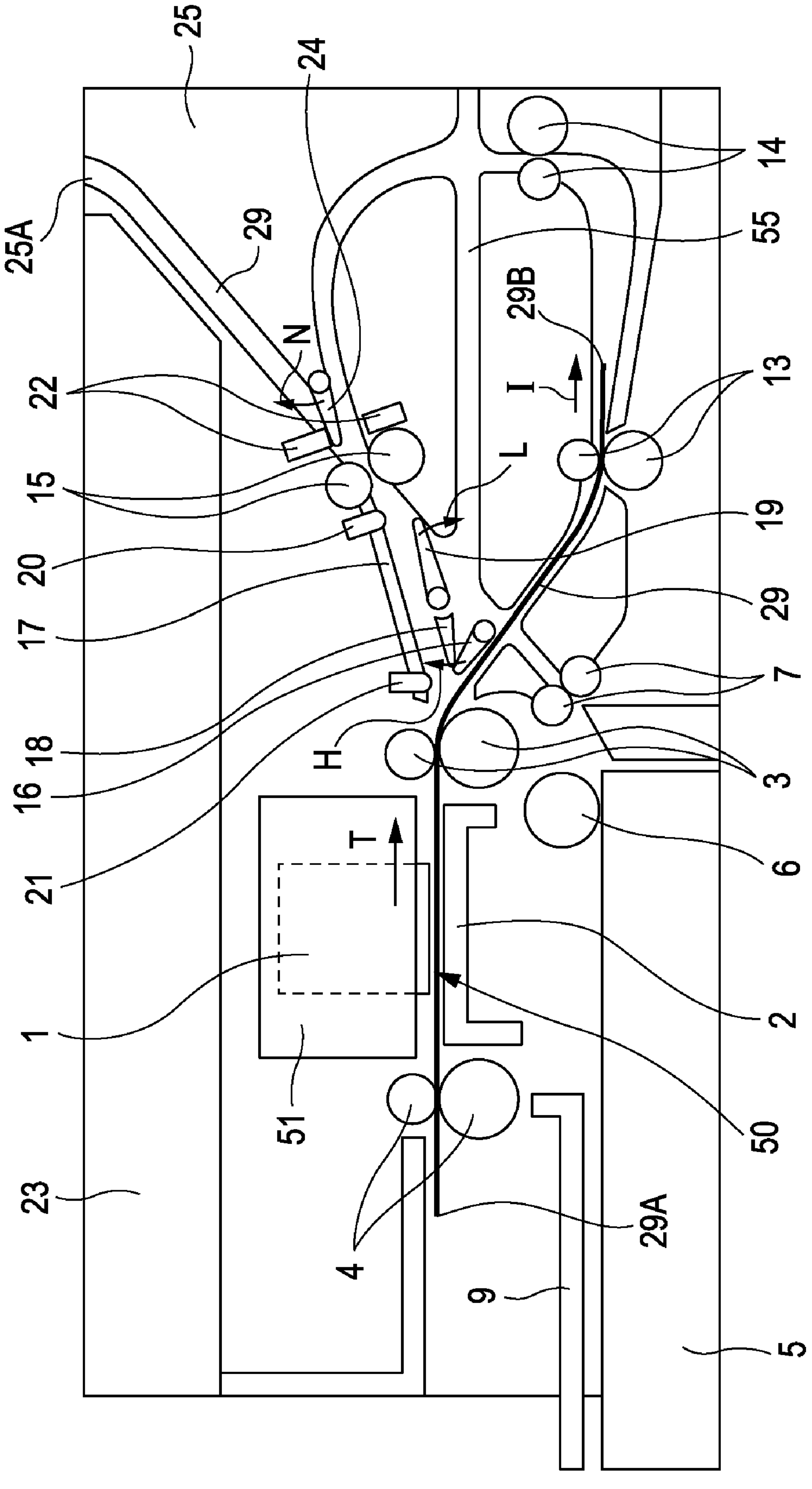
FIG. 11 is a vertical sectional view showing a state in which, for performing a duplex recording operation, a recording medium having one side recorded is reversely conveyed to introduce the recording medium to a U-turn conveying path.
Figure 12:
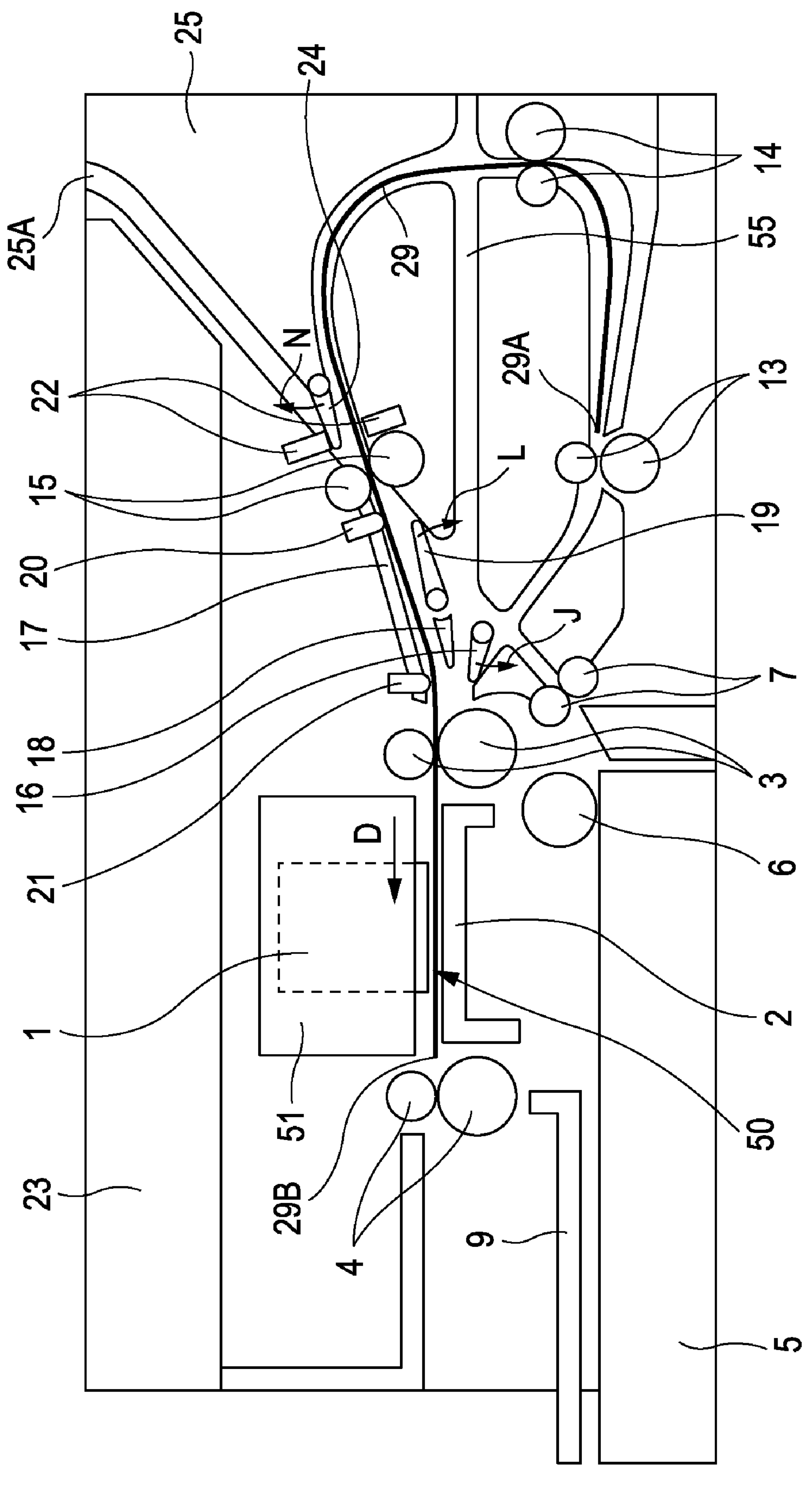
FIG. 12 is a vertical sectional view showing a state when the recording medium is conveyed along the U-turn conveying path to start recording of an image on the recording medium at an image forming portion.
Figure 13:
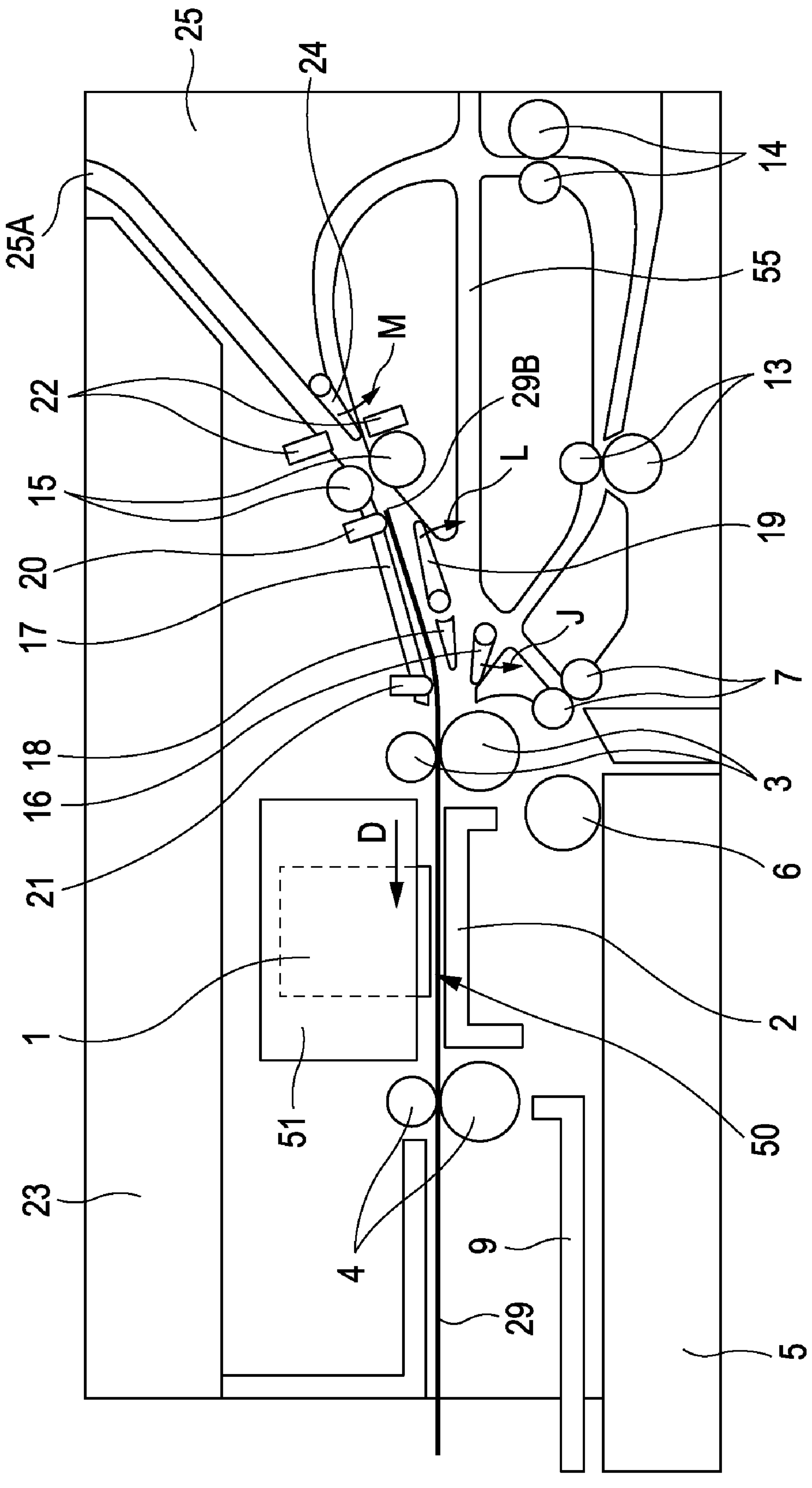
FIG. 13 is a vertical sectional view showing a state in which a preceding recording medium during continuous conveyance is redirected to perform a recording operation.
Figure 14:
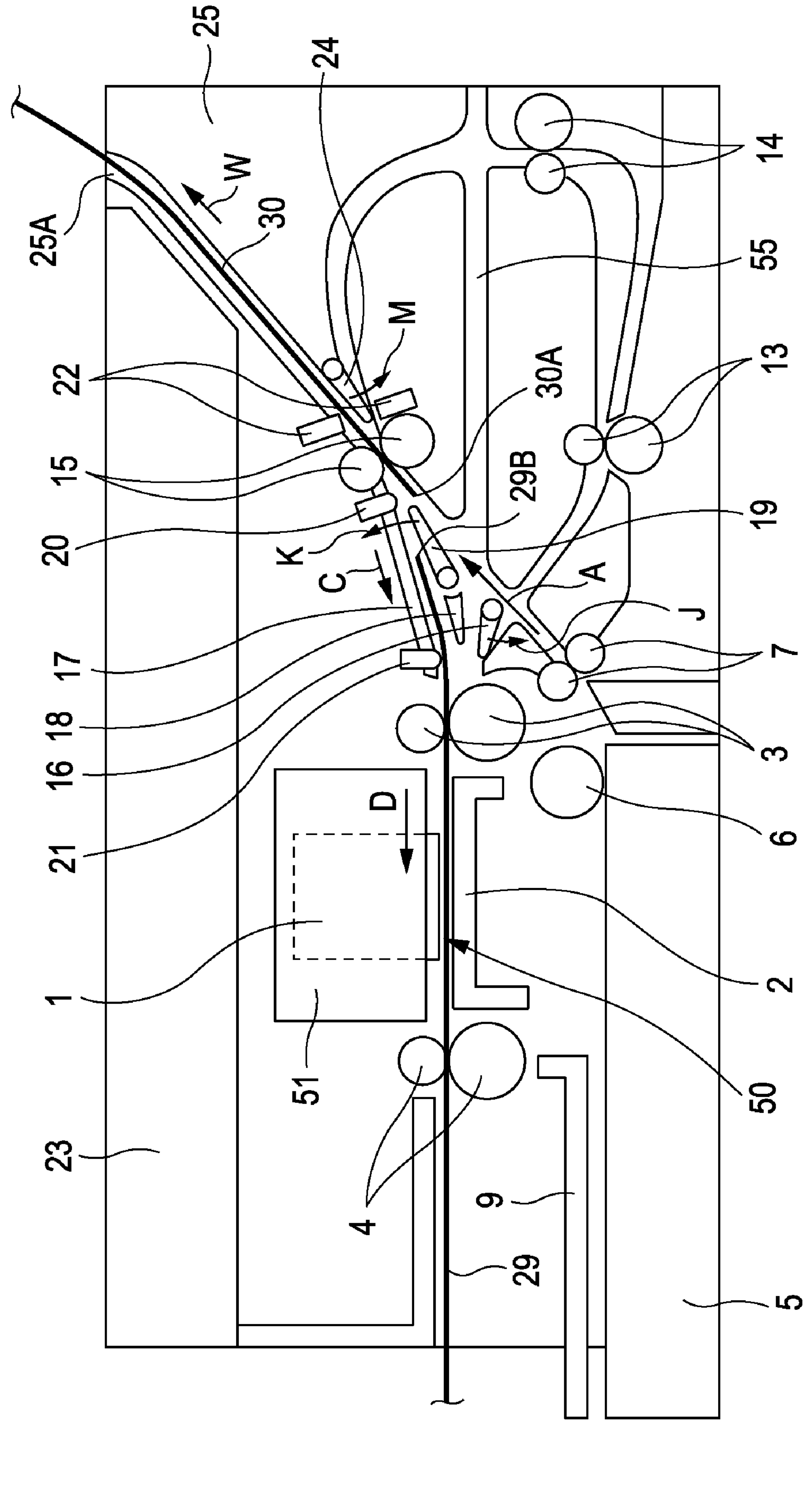
FIG. 14 is a vertical sectional view showing a state just before starting redirection of a next recording medium during the continuous conveyance.
Figure 15:
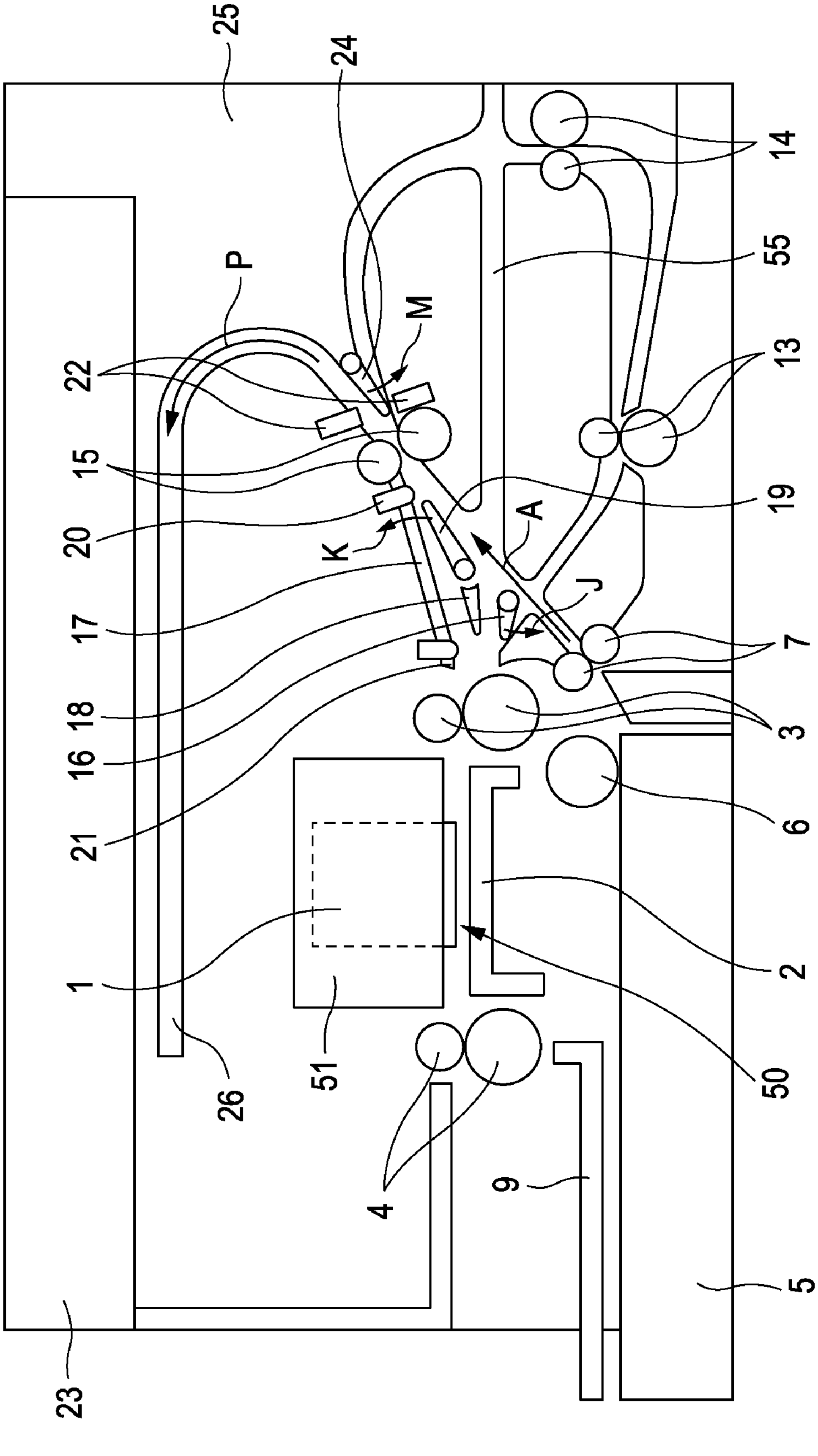
FIG. 15 is a vertical sectional view of a structure of and a conveying operation in a conveying path of a recording apparatus according to a third exemplary embodiment of the present invention.

FIG. 9 is a vertical sectional view showing a state just before a recording medium is redirected in a recording apparatus according to a second exemplary embodiment of the present invention. FIG. 10 is a vertical sectional view showing a state when the recording medium is redirected. FIG. 11 is a vertical sectional view showing a state in which, for performing a duplex recording operation, a recording medium having one side recorded is reversely conveyed to introduce the recording medium to a U-turn conveying path. FIG. 12 is a vertical sectional view showing a state when the recording medium is conveyed along the U-turn conveying path to start recording of an image on the recording medium at an image forming portion. FIG. 13 is a vertical sectional view showing a state in which a preceding recording medium during continuous conveyance is redirected to perform a recording operation. FIG. 14 is a vertical sectional view showing a state just before starting redirection of a next recording medium during the continuous conveyance. FIG. 15 is a vertical sectional view for illustrating a state when, in continuous conveyance, a next recording medium is redirected, and a state when a highly rigid recording medium is caused to reciprocate along a horizontal conveying path.

In the first embodiment, the redirecting conveying path is formed in the U-turn conveying path. In contrast, in this embodiment, a redirecting conveying path is formed so that, after a recording medium is pulled into a conveying path that is formed at the upper surface of a main body 25 of the apparatus, the recording medium is redirected. In particular, in this embodiment, after the recording medium is pulled into the redirecting conveying path, and is caused to temporarily project from the back portion of a scanner 23, disposed at the upper portion of the main body 25 of the apparatus, the conveying direction is reversed to redirect the recording medium towards conveying rollers 3. Even in this case, the redirecting conveying path is formed in the U-turn conveying path, so that similar operational effects to those of the first embodiment are provided.

Next, the U-turn of a recording medium will be described. Sheet guides 17 and 18 that constitute guide surfaces for guiding a recording medium to the conveying rollers 3 are disposed between the conveying rollers 3 and first intermediate rollers 15. A movable guide flapper 16 for switching a conveying path is disposed at a merging portion of the U-turn conveying path and the redirecting conveying path. The merging portion is disposed upstream from the conveying rollers 3 in the conveying direction.

Next, with reference to FIGS. 9 and 10, the redirecting conveying path that conveys a special sheet (second recording medium) towards the conveying rollers 3 by redirecting the special sheet in the recording apparatus according to the second embodiment will be described. As shown in FIG. 9, recording media that are held by a sheet feeding cassette 5 are picked up by a sheet feeding roller 6, and sent to separating rollers 7. A topmost sheet is separated from the other recording media, and conveyed to the first intermediate rollers 15 as indicated by arrow A. Here, by moving a guide flapper 19 in the direction of arrow K, and by moving a guide flapper 24 in the direction of arrow M, a conveying path extending from the separating rollers 7 to an opening 25A through the first intermediate rollers 15 and a pull-in conveying path is provided. The separated recording medium (recording medium 29) is conveyed in the direction of arrow A, and its type is detected when a front edge 29B of the recording medium 29 passes a media sensor 22. The recording medium 29 is further conveyed, and is stopped when its rear edge 29A is detected by a sheet-edge sensor 20. At this time, the recording medium 29 projects outside the opening 25*a* in the upper portion of the main body 25 of the apparatus.

Next, as shown in FIG. 10, the first intermediate rollers 15 are reversely rotated, to redirect the recording medium 29. This causes the recording medium 29 to be conveyed in the direction of arrow C towards the conveying rollers 3. At this time, the guide flapper 19 is moved in the direction of arrow L to provide the redirecting conveying path. In this state, the recording medium 29 is guided to sheet guides 17 and 18 and the guide flappers 16 and 19, and conveyed towards the conveying rollers 3. Then, the recording medium 29 is conveyed in the direction of arrow D to an image forming portion 50 by the conveying rollers 3, so that a recording operation is performed on its recording surface. In the redirection of the recording medium 29, since the recording surface (coat surface) of the recording medium 29 is at the upper side, the recording surface does not contact a curved outer surface having a high conveyance resistance in the conveying path. Therefore, the recording surface is conveyed without being scratched.

Next, with reference to FIGS. 11 and 12, conveyance of a recording medium when duplex recording is carried out will be described. After recording of a first surface (front surface) of a recording medium 29 is completed, the conveying rollers 3 are reversely rotated, to convey the recording medium 29 in the reverse direction (that is, in the direction of arrow T). Then, for performing the duplex recording in the embodiment, the recording medium 29 is introduced into the U-turn conveying path, and conveyed in the direction of arrow I. At this time, the guide flapper 16 moves in the direction of arrow H to provide a conveying path. The recording of the first surface (front surface) when the duplex recording is performed in the embodiment is performed on the recording medium that is fed from the sheet feeding cassette 5 and conveyed towards the conveying rollers 3. Here, the recording medium 29 may be redirected or caused to make a U-turn. The recording medium 29 that is introduced into the U-turn conveying path is conveyed by second intermediate rollers 13 and third intermediate rollers 14, so that its front and back surfaces are reversed. At this time, the guide flapper 24 at the upstream side of the first intermediate rollers 15 in the conveying direction is moved in the direction of arrow N, so that a conveying path is provided.

As shown in FIG. 12, when a sheet-edge sensor 21 detects that the rear edge 29A of the recording medium 29 has passed the guide flapper 16, the guide flapper 16 moves in the direction of arrow J. This provides a conveying path for re-conveying the recording medium 29 whose front and back surfaces are reversed to the conveying rollers 3. Then, the recording medium 29 is conveyed in the direction of arrow D through the image forming portion 50, so that a recording operation is performed on a back surface (second surface) of the recording medium 29. Accordingly, duplex recording is performed on the recording medium 29.

Next, the operation and the structure of continuously conveying the recording media in the embodiment will now be described with reference to FIGS. 13 and 14. In the embodiment, the recording media are continuously conveyed by being redirected. In FIG. 13, after a recording medium 29 is redirected and conveyed, recording is performed on the recording medium 29 while it is conveyed in the direction of arrow D by the conveying rollers 3. At this time, the guide flapper 16 moves in the direction of arrow J, and the guide flapper 19 moves in the direction of arrow L, to provide a conveying path. Then, when the sheet-edge sensor 20 detects the passage of the rear edge 29B of the recording medium 29, feeding of a next recording medium 30 (see FIG. 14) from the sheet feeding cassette 5 is started. Then, as shown in FIG. 14, the next recording medium 30 is fed and conveyed in the direction of arrow A, and is conveyed through the redirecting conveying path in the direction of arrow W by the first intermediate rollers 15. At this time, the guide flapper 19 moves in the direction of arrow K, and the guide flapper 24 moves in the direction of arrow M, to provide a conveying path of the recording medium 30.

The recording medium 29 is continuously conveyed in the direction of arrow D and the direction of arrow C while recording is performed on the recording medium 29 at the image forming portion 50. When a rear edge 30A of the recording medium 30 is detected by the sheet-edge sensor 20, the first intermediate rollers 15 stop conveying the recording medium 30, and rotate in the reverse direction to reverse the conveying direction, so that redirection of the recording medium 30 in the direction of arrow C is started. At this time, as shown in FIG. 15, the guide flapper 19 moves in the direction of arrow L, to provide a redirecting conveying path of the recording medium 30. When the rear edge 29B of the recording medium 29 is detected by the sheet-edge sensor 21, the recording medium 30 is further conveyed in the direction of arrow C until its front edge 30A reaches the sheet-edge sensor 21. At this time, while a short interval is maintained between the rear edge 29B of the recording medium 29 and the front edge 30A of the next recording medium 30, both recording media are continuously conveyed at the same time.

Then, after a recording operation on the recording medium 29 that is conveyed in the direction of arrow D is completed, it is ejected out of the main body of the apparatus by the sheet ejecting rollers 4. During the ejecting operation, the next recording medium 30 is conveyed in the direction of arrow D by the conveying rollers 3, and an image is formed on the next recording medium 30. Accordingly, the ejecting of the recording medium 29, and the conveying of the next recording medium 30 to the image forming portion are performed at the same time, so that the recording media 29 and 30 are continuously conveyed. Therefore, it is possible to reduce recording time when continuously performing the recording operations.

Third Exemplary Embodiment

FIG. 15 is a vertical sectional view of a structure of and a conveying operation in a conveying path of a recording apparatus according to a third exemplary embodiment of the present invention. In the second exemplary embodiment, the redirecting conveying path is formed by a conveying path having an opening 25A at the upper portion of the main body of the apparatus. In contrast, in the third exemplary embodiment, a redirecting conveying path is formed in a main body 25 of the apparatus so as to be disposed between an image forming portion 50 and a scanner 23. When a recording medium is pulled in for being redirected, the recording medium that is fed from a sheet feeding cassette 5 is conveyed from the direction of arrow A to the direction of arrow P. Then, the recording medium is conveyed to a conveying path 26 formed between the image forming portion 50 and the scanner 23. The conveying path 26 constitutes part of the redirecting conveying path.

That is, after the recording medium is conveyed into the conveying path 26, first intermediate rollers 15 are reversely rotated to reverse the conveying direction, so that, as in the second embodiment, the recording medium is redirected towards the conveying rollers 3. In the embodiment, the scanner 23 is disposed at the upper portion of the main body 25 of the apparatus. When the recording medium is pulled into the redirecting conveying path, the recording medium is conveyed between the image forming portion 50 and the scanner 23, to reverse the conveying direction between the image forming portion 50 and the scanner 23, so that the recording medium is redirected towards the conveying rollers 3.

Fourth Exemplary Embodiment

Figure 16:
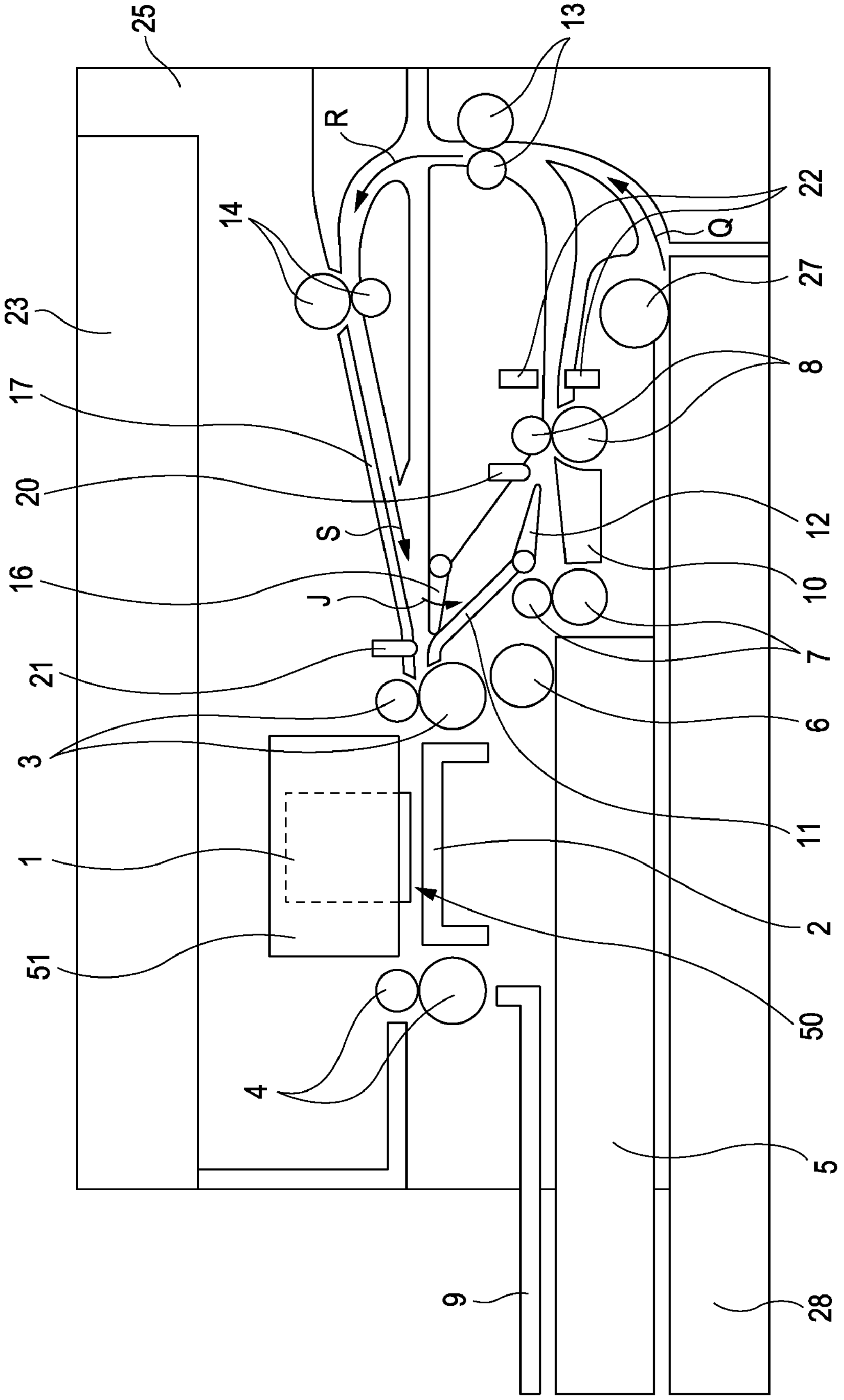
FIG. 16 is a vertical sectional view of a structure of and a conveying operation in a conveying path of a recording apparatus according to a fourth exemplary embodiment of the present invention.

FIG. 16 is a vertical sectional view of a structure of and a conveying operation in a conveying path of a recording apparatus according to a fourth exemplary embodiment of the present invention. In the first exemplary embodiment, a recording medium is fed from one sheet feeding section (sheet feeding cassette 5). In this embodiment, a second sheet feeding section (sheet feeding cassette 28) is added to the structure of the first embodiment, so that a recording medium is fed and conveyed from the front side of a main body 25 of the apparatus using two conveying paths. At the front side of the main body 25 of the apparatus, a first sheet feeding cassette 5 is removably mounted to the upper side, and the second sheet feeding cassette 28 is removably mounted to the lower side. Recording media held by the second sheet feeding cassette 28 are sent out by a sheet feeding roller 27, are separated one at a time by separating rollers (not shown), and are conveyed in the direction of arrow Q towards second intermediate rollers 13. That is, in the embodiment, the recording media are supplied to a U-turn conveying path and a redirecting conveying path from the upper sheet feeding section 5, and the recording media are supplied to the U-turn conveying path from the lower sheet feeding section 28. In the embodiment, the recording media can also be supplied to the redirecting conveying path from the lower sheet feeding section 28. It is desirable that the upper sheet feeding section 5 supply recording media of all types including those having treated recording surfaces, and the lower sheet feeding section 28 supply recording media other than the recording media having treated recording surfaces.

In FIG. 16, a recording medium that is supplied from the second sheet feeding cassette 28 is conveyed in the direction of arrow Q, and is caused to make a U-turn in the direction of arrow R by the second intermediate rollers 13 and third intermediate rollers 14. The recording medium is further conveyed in the direction of arrow S along a sheet guide 17, so that an image is recorded on the recording medium at an image forming portion 50. The recorded recording medium is ejected onto a sheet ejecting tray 9 by sheet ejecting rollers 4.

In the fourth exemplary embodiment, it is appropriate to use the first sheet feeding section that feeds recording media from the sheet feeding cassette 5 to the redirecting conveying path in the U-turn conveying path as a sheet feeding section for all types of recording media or a sheet feeding section provided exclusively for special sheets. The second sheet feeding section that feeds recording media from the second sheet feeding cassette 28 to the second intermediate rollers 13 can be used as a sheet feeding section provided exclusively for ordinary sheets. The second sheet feeding section can also be used as a sheet feeding section for all types of recording media excluding highly rigid sheets which are used exclusively for photography, which tend to be scratched, which are surface-treated, and which have coat layers.

According to the fourth exemplary embodiment, it is possible to supply ordinary sheets to the U-turn conveying path from the second sheet feeding section, and to supply special sheets to the redirecting conveying path from the first sheet feeding section. This structure allows the recording media to be set in two ways. Therefore, the special sheets can be conveyed without scratching the coat surfaces, and both the special sheets and ordinary sheets can be easily continuously conveyed, so that high-speed recording can be performed on both the special sheets and ordinary sheets. Consequently, sheet feeding performance can be further improved.

Fifth Exemplary Embodiment

Figure 17:
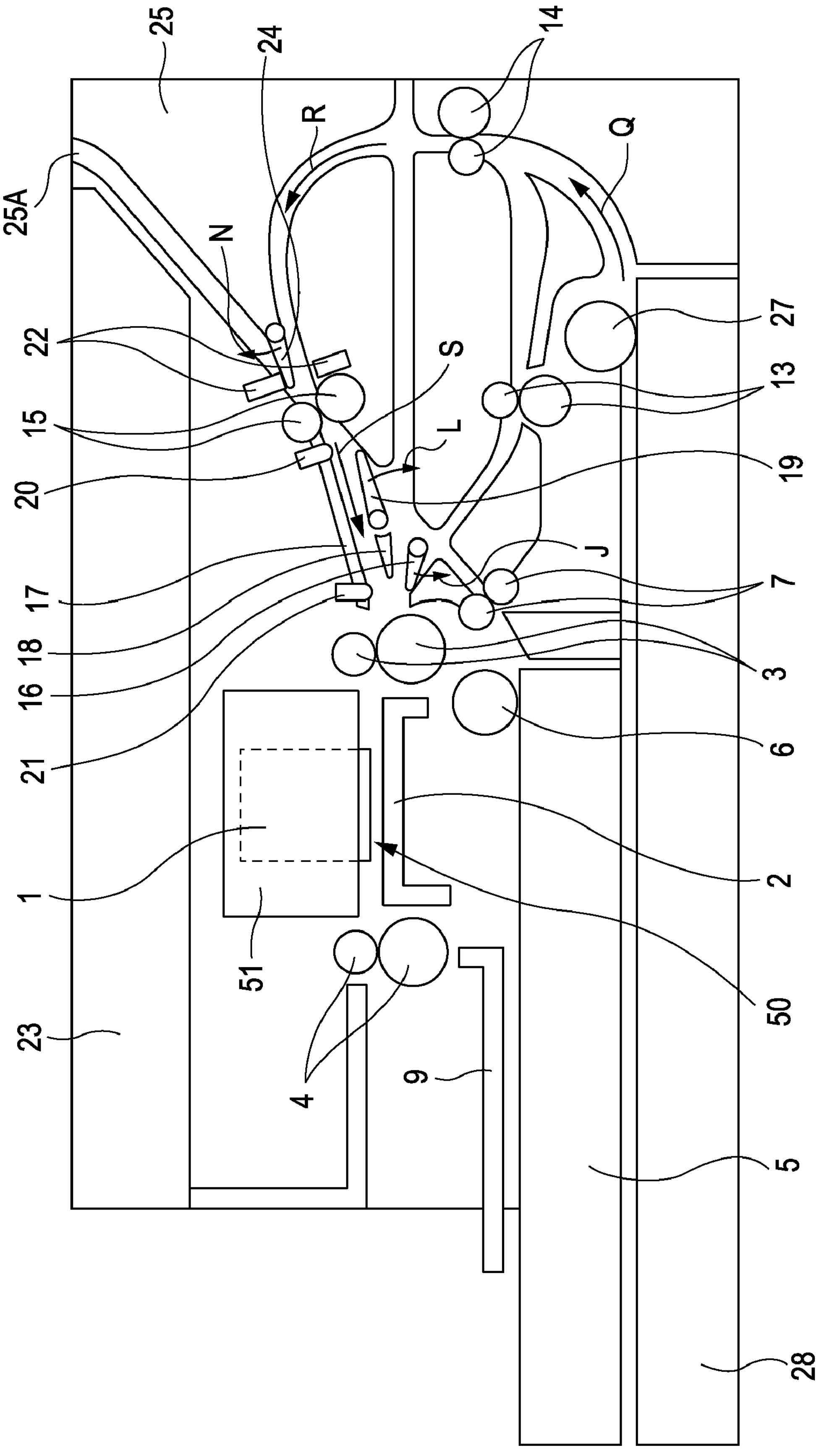
FIG. 17 is a vertical sectional view of a structure of and a conveying operation in a conveying path of a recording apparatus according to a fifth exemplary embodiment of the present invention.

FIG. 17 is a vertical sectional view of a structure of and a conveying operation in a conveying path of a recording apparatus according to a fifth embodiment of the present invention. In the second embodiment, recording media are supplied from one sheet feeding section (sheet feeding cassette 5). In the fifth exemplary embodiment, a second sheet feeding section (sheet feeding cassette 28) is added to the structure of the second embodiment, so that the recording media are fed and conveyed from the front side of a main body 25 of the apparatus using two sheet feeding sections. In FIG. 17, at the front side of a main body 25 of the apparatus, a first sheet feeding cassette 5, which is similar to that of the second exemplary embodiment, is removably mounted to the upper side, and the second sheet feeding cassette 28 is removably mounted to the lower side. Recording media held by the second sheet feeding cassette 28 are sent out by a sheet feeding roller 27, are separated one at a time by separating rollers (not shown), and are conveyed in the direction of arrow Q towards third intermediate rollers 13.

In FIG. 17, a recording medium that is supplied from the second sheet feeding cassette 28 is conveyed in the direction of arrow Q, and is caused to make a U-turn in the direction of arrow R by third intermediate rollers 14. Further, first intermediate rollers 15 convey the recording medium towards conveying rollers 3 in the direction of arrow S along a sheet guide 17. The conveying rollers 3 convey the recording medium to an image forming portion 50, so that an image is recorded on the recording medium. The recorded recording medium is ejected onto a sheet ejecting tray 9 by sheet ejecting rollers 4.

According to the fifth exemplary embodiment, it is appropriate to use the first sheet feeding section that feeds recording media from the sheet feeding cassette 5 to the redirecting conveying path as a sheet feeding section for all types of recording media or a sheet feeding section provided exclusively for special sheets. The second sheet feeding section that feeds recording media from the second sheet feeding cassette 28 to the third intermediate rollers 14 can be used as a sheet feeding section provided exclusively for ordinary sheets. The second sheet feeding section can also be used as a sheet feeding section for all types of recording media excluding highly rigid sheets which are used exclusively for photography, which tend to be scratched, which are surface-treated, and which have coat layers.

According to the fifth exemplary embodiment, it is possible to supply ordinary sheets to the U-turn conveying path from the second sheet feeding section, and to supply special sheets to the redirecting conveying path from the first sheet feeding section. This structure allows the recording media to be set in two ways. Therefore, the special sheets can be conveyed without scratching the coat surfaces, and both the special sheets and ordinary sheets can be easily continuously conveyed, so that high-speed recording can be performed on both the special sheets and ordinary sheets. Consequently, sheet feeding performance can be further improved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-125234 filed May 10, 2007, which is hereby incorporated by reference herein in its entirety.

What is claimed is:

1. A recording apparatus that performs recording on recording media by a recording head in a recording section, the recording apparatus comprising:

a stacking section at which the recording media are stacked;

U-turn path for conveying the recording media, fed from the stacking section, in a first direction opposite to a conveying direction of the recording media when the recording is performed by the recording head, then conveying the recording media in a second direction same as the conveying direction when the recording is performed to the recording section, and reversing front and back sides of the recording media; and a guide path for guiding recording media in the U-turn path to the recording section without passing through the U-turn path, wherein, when a first recording medium is conveyed from the stacking section to the recording section, the first recording medium is conveyed through the U-turn path so that the front and back sides of the recording medium are reversed, and wherein, when a second recording medium, which is different from the first recording medium, is conveyed from the stacking section to the recording section, the second recording medium is conveyed in the U-turn path in the first direction and then is conveyed in a direction that is opposite to the first direction so that the second recording medium is guided by the guide path before the recording is performed on the second recording medium.

2. The recording apparatus according to claim 1, further comprising a feeding roller configured to feed the recording media stacked at the stacking section, wherein, when the first recording medium is fed, the feeding roller comes into contact with a reverse side of a recording surface of the first recording medium on which the recording is to be performed by the recording head, and wherein, when the second recording medium is fed, the feeding roller comes into contact with a recording surface thereof on which the recording is to be performed by the recording head.

3. The recording apparatus according to claim 1, wherein the first recording medium is conveyed in the U-turn path while a recording surface thereof is disposed at an outer side.

4. The recording apparatus according to claim 1, further comprising a sensor disposed downstream from the feeding roller, and configured to detect types of the recording media.

5. The recording apparatus according to claim 1, further comprising an intermediate roller disposed in the U-turn path and conveying the recording media fed by a feeding roller, wherein the second recording medium is conveyed in the second direction before a rear edge of the second recording medium fed by the feeding roller passes the intermediate roller.

6. The recording apparatus according to claim 5, further comprising a movable guiding member disposed between the feeding roller and the intermediate roller, the guiding member guiding the second recording medium to the guide path when the second recording medium in the U-turn path is conveyed in the direction opposite to the first direction.

7. The recording apparatus according to claim 1, wherein, when the second recording medium is fed, after causing a portion of the second recording medium to protrude from an upper surface of the apparatus, the conveying direction is reversed to convey the second recording medium.

8. The recording apparatus according to claim 1, further comprising a scanner disposed at an upper surface of the apparatus, wherein, after conveying a portion of the second recording medium below the scanner, the conveying direction is reversed to convey the second recording medium.

9. A recording apparatus that performs recording on recording media by a recording head in a recording portion, the recording apparatus comprising:

a stacking section at which the recording media are stacked;

a U-turn path for conveying the recording media from the stacking section to the recording portion; and a guide path for guiding recording media in the U-turn path to the recording section without passing through the U-turn path, wherein in a process of conveying a first recording medium from the stacking section to the printing portion, the first recording medium is conveyed through the U-turn path such that the front and back sides of the first recording medium are reversed at the printing portion, and wherein in a process of conveying a second recording medium, which is different from the first recording medium, from the stacking section to the printing portion, the second recording medium is conveyed in the U-turn path in a first direction, and then is conveyed in a second direction that is opposite to the first direction so that the second recording medium is guided by the guide path.

* * * * *